June 8, 1965   P. E. KARISCH   3,187,457
LURE
Filed Nov. 12, 1963
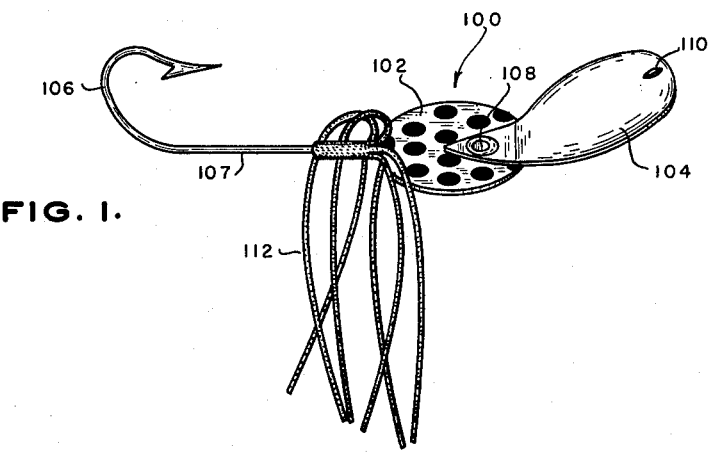
FIG. 1.
FIG. 2.
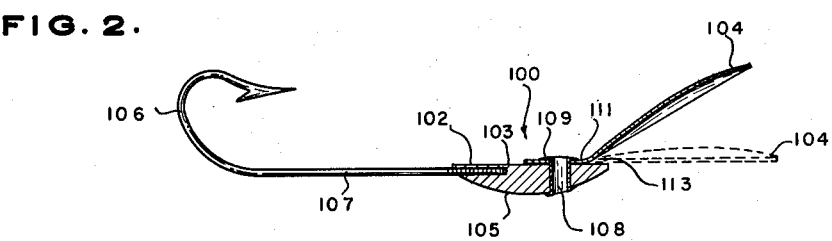
FIG. 4.
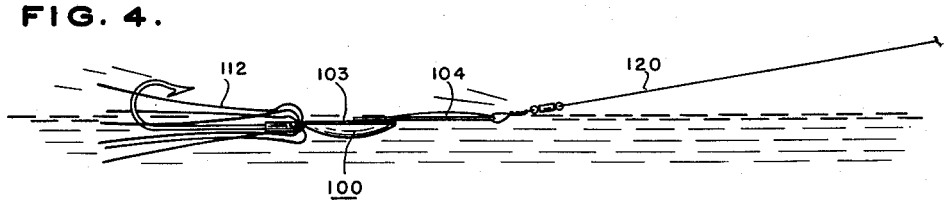
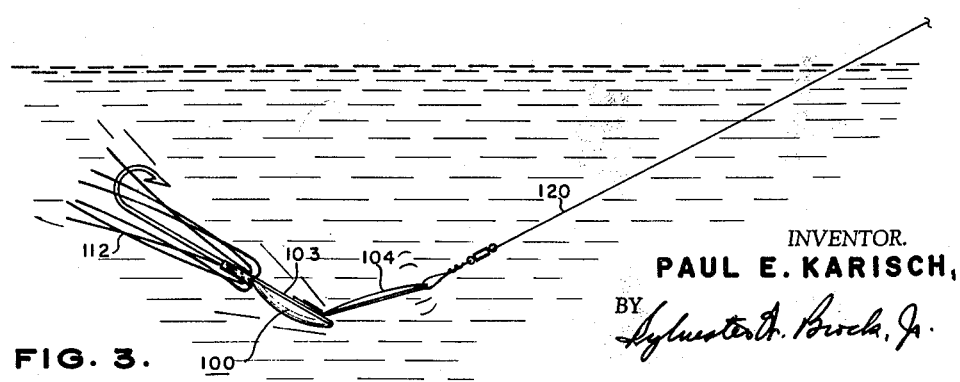
FIG. 3.
INVENTOR.
PAUL E. KARISCH,
BY
ATTORNEY.

3,187,457
LURE
Paul E. Karisch, 6315 Tulsa St., Houston 18, Tex.
Filed Nov. 12, 1963, Ser. No. 322,995
4 Claims. (Cl. 43—42.06)

The present invention relates to a non-buoyant fishing lure. More particularly, the present invention relates to a non-buoyant fishing lure which comprises a body portion having a passage therethrough and an attached scoop, which in combination cause the fishing lure to produce an erratic action upon being retrieved.

Fishing lures are of many types, depending upon the type of fish for which the lure is to be used and the conditions under which the lure will be employed. It is highly desirable that a lure have an erratic motion in order to attract fish to the lure. The present invention constitutes a highly active lure which effectively simulates the erratic motion of small fishes, thereby encouraging game fish to strike at the lure.

All of this is more clearly understood by reference to the drawing wherein:

FIG. 1 is an isometric view of the lure of the present invention outfitted with a rubber skirt;

FIG. 2 is a sectional elevation of the lure of the present invention;

FIG. 3 is a schematic diagram showing the action of the present invention as a deep-running lure; and FIG. 4 illustrates the use of the present invention as a top-running lure.

Turning now to the figures wherein similar numerals indicate similar parts, FIG. 1 illustrates a fishing lure 100 having a body portion 102, a scoop portion 104, and a hook portion 106. A passage 108 is provided through the body portion and normal to the upper surface thereof. The hook 106 extends rearwardly from the body 102 on the center line which extends through the passage 108, and a perforation 110 is provided at the forward extremity of scoop 104 for the attachment of the leader. A rubber skirt such as 112 may be attached to the hook, it being understood that a bucktail or vermiform appendage may be substituted therefor.

Turning to FIG. 2, the construction of the lure is more clearly illustrated, and the lure is seen to comprise the body portion 102 which has a planar circular shaped upper surface 103 and a rounded lower surface 105. The body portion may suitably be made of cast lead and may weigh from about 0.2 ounce to 0.35 ounce, and may have a diameter of 0.7 to 1.0 inch. The hook 106 has a shank portion 107 which extends into the body 102 and is frictionally engaged, preferably by casting the body about the shank.

Passage 108 is shown to extend through the body 102 and normal to the planar upper surface 103. This passage has an inner diameter of about ⅛ inch when the body is within the preferable range of 0.7 to 1 inch in diameter. In the preferred embodiment as shown in FIG. 2, this passage is defined by an open rivet 109 which passes through the body and also through the mounting portion 111 of scoop 104. Thus, the rivet 109 serves the dual function of retaining the scoop 104 in place and also of defining the passage 108.

As is shown in FIG. 2, the scoop 104 may be constructed of deformable material, such as a soft metal, so that it may be moved from a position of defining an angle of about 45° with the upper planar surface 103 to a position of substantially 0° deflection therefrom. The point of deformation, which actually is the point where the scoop meets the upper surface, indicated in FIG. 2 by the numeral 113, should be from about ½ inch to ¾ inch forward of the center of the body 102 when the preferred size range is employed.

As a general guide, the lure may be said to comprise a generally circular body with a planar upper surface and a curved lower surface, preferably comprising the segment of a sphere, with a hook depending from and extending rearwardly from the body, and a concavo-convex scoop attached to and extending forwardly of the body with the concave side down. The scoop may have an area of about 0.5 to 1.5 times the area of the planar upper surface of the body and may weigh from ¼ to ½ as much as the body of the lure. The scoop is generally oval or elliptical in plan, having a major dimension 1.5 to 2.0 times as great as the minor dimension. The point of attachment (that is, the point 113 where the scoop face touches the lure body) should be located about ⅕ to ⅔ of a radius of the circular upper surface forward of the center thereof, and the scoop should define an angle of 0 to 45° with the planar surface of the body.

An open passage through the body of the lure should be provided just to the rear of the point of attachment 113 of the scoop, the center of the passage being from ¼ to ¾ radii forward of the center of the upper surface of the body and being no more than 10° offset from the longitudinal center line of the assembled lure. The diameter of the passage should be from about ¼ to ⅓ the radius of the body.

The hook should extend rearwardly from the body on the center line thereof with the shank parallel to the planar surface, with the point of the hook being above the planar surface. Rubber streamers, a bucktail skirt, or a vermiform appendage may be attached to the hook to provide a modified appearance and action.

Referring now to FIG. 3, the action of the lure 100 with the scoop 104 defining an angle of about 45° with the body 102 is illustrated. Under these circumstances, the lure will perform as a deep-running lure because of the downward component of force resulting from the forward pull on the leader 120 and the reaction of water against upper planar surface 103. Whereas, referring to FIG. 4, when the scoop 104 defines an angle of essentially 0° with the upper planar surface 103, there is no downward component resulting from forward pull on the leader 120, and the lure tends to move along the surface of the water.

The passage 108 allows water to flow through the body during the retrieval of the lure, setting up vortices in the water on the underside of the lure when it is acting as a deep-running lure, resulting in an erratic wobbling motion which is highly desirable. When the lure is being used for top-running action, the passage of water upwardly through the passage 108 likewise contributes to an erratic side-to-side motion. This wobbling motion is amplified by the curved undersurface of the lure and the dished aspect of the scoop 104.

Having described in detail the present invention, including a specific embodiment thereof, what is desired to be protected by Letters Patent is to be limited not by the specific examples herein given, but rather only by the appended claims.

I claim:
1. A non-buoyant fishing lure which comprises a
    solid body having a generally planar, circular, upper surface, and a rounded lower surface,
    a deformable scoop attached to said body, having a downwardly directed, concave face and defining an angle of 0 to 45° with the planar face of said body at a line of deformation,
    said scoop being attached to said body at a point ⅕ to ⅔ of a radius based on said circular upper surface from the center of the upper surface of the body,
    said scoop having a major dimension which is from 1.5 to 2.0 times as great as the minor dimension, and and area of 0.5 to 1.5 times the area of the planar up- per surface of said body and weighing from ¼ to ½ as much as said body, the body having a passage through said body to the rear of the line of deformation of said scoop, said passage being from ¼ to ¾ radii from the center of the upper surface of the body and being not more than 10° offset from the longitudinal center line of the assembled lure, said passage having a diameter from ¼ to ⅓ the radius of said upper surface of the body, a hook comprising a shank and a point, said hook extending rearwardly from said body on the longitudinal center line thereof and having the shank parallel to said planar surface, and the point of the hook being above said planar surface, and rubber streamers attached to the shank of said hook.

2. Apparatus in accordance with claim 1 wherein the body is the segment of a sphere.

3. A non-buoyant fishing lure which comprises a body having a generally planar, circular, upper surface and a rounded lower surface, said circular surface having a diameter of about 0.7 inch to about 1 inch and weighing from about 0.2 ounce to about 0.35 ounce, a deformable scoop attached to said body having a concave face downwardly directed and defining an angle of 0 to 45° with the planar face of said body at a line of deformation, said scoop being attached to said body at a point from ½ to ¾ inch from the center of the upper surface of the body, said scoop having an area of from 0.5 to 0.75 square inch and weighing from 0.04 ounce to 0.1 ounce, the body having a passage through said body to the rear of the line of deformation of said scoop being from ½ to ¾ inch from the center of the upper surface of the body and having a diameter of about ⅛ inch, a hook having a shank and a point, said hook extending rearwardly from said body on the longitudinal center line thereof and having the shank parallel to said planar surface, and the point of the hook being above said planar surface, and rubber streamers attached to the shank of said hook.

4. A fishing lure which comprises a hook, a body portion having a generally circular planar upper surface and a rounded lower surface, a deformable scoop attached to the planar surface of said body and having a concave lower face which defines an angle of about 0 to 45° with said upper surface at a line of deformation, wherein said body has a single passage through said body normal to said upper surface and located to the rear of the line of deformation of said scoop, said passage having a diameter of ¼ to ⅓ the radius of said planar upper surface.

References Cited by the Examiner
UNITED STATES PATENTS

| | | | |
|---|---|---|---|
| 1,870,767 | 8/32 | Brown | 43—42.39 X |
| 2,290,512 | 7/42 | Weesner | 43—42.47 X |
| 2,467,244 | 4/49 | Van Hee et al. | 43—42.06 |
| 2,700,240 | 1/55 | Gibbs | 43—42.4 |

ABRAHAM G. STONE, *Primary Examiner.*